(12) United States Patent
Takada et al.

(10) Patent No.: US 8,104,971 B2
(45) Date of Patent: Jan. 31, 2012

(54) RESIN CAGE FOR BALL BEARING

(75) Inventors: Yoshito Takada, Nara (JP); Katsuyuki Harada, Yamatokoriyama (JP); Youichi Tsuzaki, Kashiba (JP); Toshihiro Hakata, Kashiwara (JP); Masaru Deguchi, Kashihara (JP)

(73) Assignee: JTEKT Corporation, Osaka (JP)

( * ) Notice: Subject to any disclaimer, the term of this patent is extended or adjusted under 35 U.S.C. 154(b) by 631 days.

(21) Appl. No.: 12/230,334

(22) Filed: Aug. 27, 2008

(65) Prior Publication Data

US 2009/0074341 A1 Mar. 19, 2009

(30) Foreign Application Priority Data

Aug. 28, 2007 (JP) ................................. 2007-220968
Jul. 8, 2008 (JP) ................................. 2008-178197

(51) Int. Cl.
*F16C 33/38* (2006.01)
*F16C 33/41* (2006.01)
*F16C 33/56* (2006.01)

(52) U.S. Cl. ..................... 384/523; 384/527; 384/531

(58) Field of Classification Search .................. 384/450, 384/523, 526–527, 531, 572, 576
See application file for complete search history.

(56) References Cited

U.S. PATENT DOCUMENTS

| | | | | |
|---|---|---|---|---|
| 4,019,790 A * | 4/1977 | Earsley et al. | ................. | 384/526 |
| 4,169,636 A * | 10/1979 | Hooper | ......................... | 384/527 |
| 5,035,520 A * | 7/1991 | Valette | .......................... | 384/526 |
| 5,118,207 A * | 6/1992 | Ikejiri et al. | ................... | 384/527 |
| 5,722,780 A * | 3/1998 | Scharman | ..................... | 384/531 |
| 5,807,920 A | 9/1998 | Ueno et al. | | |
| 6,200,038 B1 * | 3/2001 | Fierling | ........................ | 384/531 |
| 6,371,652 B1 * | 4/2002 | Koyama et al. | ............... | 384/531 |
| 6,371,655 B1 * | 4/2002 | Fierling | ........................ | 384/470 |
| 6,533,462 B2 * | 3/2003 | Kawakami | .................... | 384/470 |
| 6,926,447 B2 * | 8/2005 | Hamamoto et al. | ........... | 384/527 |
| 7,594,761 B2 * | 9/2009 | Koyama et al. | ............... | 384/572 |

FOREIGN PATENT DOCUMENTS

| | | | |
|---|---|---|---|
| JP | 07-190069 | | 7/1995 |
| JP | 09151943 A | * | 6/1997 |
| JP | 2000220642 A | * | 8/2000 |
| JP | 2006009988 A | * | 1/2006 |
| JP | 2006-112595 | | 4/2006 |
| JP | 2006170276 A | * | 6/2006 |
| JP | 2007333187 A | * | 12/2007 |
| JP | 2008025627 A | * | 2/2008 |

\* cited by examiner

*Primary Examiner* — Marcus Charles
(74) *Attorney, Agent, or Firm* — McGinn IP Law Group, PLLC

(57) ABSTRACT

It is a cage that is formed of a resin and that holds balls serving as rolling elements. The cage includes an annular base portion, and a plurality of claw portions that are formed to be arranged at constant intervals on the circumference of the base portion and to protrude therefrom. A pocket for accommodating the ball is formed between each pair of adjacent ones of the claw portions. In the resin cage for a ball bearing, thinning recesses are formed in end parts 11*a* of the claw portions and a rear surface of the base portion, respectively.

19 Claims, 5 Drawing Sheets

RESIN CAGE FOR BALL BEARING

BACKGROUND OF THE INVENTION

The present invention relates to a resin cage to be employed in a ball bearing.

A ball bearing includes an inner ring, an outer ring, a plurality of balls interposed therebetween, and a cage which holds each of the adjacent balls to be separated from each other In recent years, a resin cage formed by injection molding has been widely used as a cage for such a ball bearing. For example, JP-A-7-190069 describes an example of a resin cage for an angular contact ball bearing. As illustrated in FIG. 6, such a resin cage is formed substantially like a crown, and includes an annular base portion 20, and a plurality of claw portions 21 that are formed to be arranged on the circumference of the base portion 20 at constant intervals and to protrude therefrom. A concave-sphere-like pocket 22 for accommodating a ball is formed between each pair of the adjacent claw portions 21.

Meanwhile, for the convenience of accommodating a spherical object in each of the pockets 22, such a resin cage is shaped so that the thickness of a region extending from a central part to an end part of each of the claw portions 21 sharply increases. Such a sharp change in the thickness may deteriorate the flowability of resin at injection molding with the result of causing injection-molding defects, such as sink marks and air bubbles. In addition, the presence of a thickness difference may cause variation in cooling-down time of resin at injection molding with the result of generation of internal stress and occurrence of shape distortion.

Further, grease for lubrication is enclosed in a space (hereunder referred to as an "internal space") surrounded by the outer ring and the inner ring of the ball bearing in which the resin cage is mounted. For lengthening the life of the ball bearing, it is desirable to enclose a larger amount of grease in the internal space. However, in a case where grease leaks out of the internal space, problems of safety and appearance occur. Thus, a large internal space is desirable for enclosing a larger amount of grease in the internal space while suppressing grease from leaking therefrom. However, it becomes problematic that the substantial volume of the internal space is reduced by inserting the resin cage into the ball bearing.

SUMMARY OF THE INVENTION

The invention is accomplished in view of such circumstances. An object of the invention is to provide a resin cage for a ball bearing, which can properly suppress the deterioration of the flowability of resin at the molding thereof and the generation of internal stress due to the presence of a thickness difference among parts of the cage to thereby enhance the moldability of a cage that is a resin molded-article.

Also, another object of the invention is to provide a resin cage for a ball bearing, which can increase the substantial volume of the internal space of the ball bearing, as compared with the conventional resin cages, in the case of mounting the resin cage therein by reducing the volume of the resin cage and which can increase an amount of grease which can be enclosed into the internal space while suppressing the leakage of the grease to be enclosed thereinto.

To achieve the forgoing objects, according to an aspect of the invention, there is provided a resin cage for a ball bearing, which is formed of a resin and holds balls serving as rolling elements of the ball bearing, and which has an annular base portion and a plurality of claw portions that are formed to be arranged at constant intervals on a circumference of the base portion and to protrude therefrom, and which is constructed so that a pocket for accommodating the ball is formed between each pair of adjacent ones of the claw portions. The resin cage is characterized in that a thinning recess is formed in an end part of each of the claw portions.

In the aforementioned configuration, a thinning recess is formed in each claw portion's end part which is intrinsically and locally thick. Thus, the thickness of the end part can be suppressed. Consequently, the uniformization of the thickness can be achieved over the entire resin cage. Thus, the deterioration of the flowability of resin at molding thereof and the generation of internal stress, which are caused due to the presence of a thickness difference among parts of the cage, can be suppressed properly. Accordingly, the moldability of the cage, which is a resin molded article, can be enhanced. Consequently, the shape of the cage can be formed with high precision dimensions.

Further, because a thinning recess is formed in an end part of each of the claw portions, the volume of the entire resin cage for a ball bearing can be made small, as compared with those of the conventional cages. Accordingly, a large space can remain as the internal space of the ball bearing, in which the resin cage is mounted. Thus, an amount of grease, which can be enclosed in the internal space of the ball bearing, is increased. In addition, in a case where grease of the same amount is enclosed in the internal space, the leakage of grease can be suppressed due to the increase of the space in which grease is held.

Furthermore, because a thinning recess is formed in an end part of each of the claw portions, the shape of the resin cage for a ball bearing becomes an indented and complicated one. Thus, the leakage of grease into the inside of the bearing can be further suppressed by suppressing the flowability of grease enclosed into the internal space of the ball bearing.

Incidentally, in the substantially crown-shaped resin cage having the annular base portion and the plurality of claw portions formed to protrude therefrom as described above, not only the end parts of the claw portions but the base portion is a locally thickened part. Thus, the further uniformization of thickness can be achieved by forming a thinning recess also on the rear surface of the base portion. Consequently, the moldability of the cage, which is a resin molded article, can be further enhanced.

Further, to achieve the foregoing objects, according to another aspect of the invention, there is provided a resin cage for a ball bearing, which is formed of a resin and holds balls serving as rolling elements of the ball bearing, and which has an annular base portion and a plurality of claw portions that are formed to be arranged at constant intervals on a circumference of the base portion and to protrude therefrom, and which is constructed so that a pocket for accommodating the ball is formed between each pair of adjacent ones of the claw portions. This resin cage is characterized in that a thinning recess is formed in a rear surface of the base portion.

In such a configuration, a thinning recess is formed in the rear surface of the base portion which is intrinsically and locally thick. Thus, the thickness of the base portion can be suppressed. Consequently, the uniformization of the thickness can be achieved over the entire resin cage. Thus, the deterioration of the flowability of resin at molding thereof and the generation of internal stress, which are caused due to the presence of a thickness difference among parts of the cage, can be suppressed properly. Accordingly, the moldability of the cage, which is a resin molded article, can be enhanced. Consequently, the shape of the cage-can be formed with high precision dimensions.

Moreover, because a thinning recess is formed in the rear surface of the base portion, the volume of the entire resin cage for a ball bearing can be made small, as compared with those of the conventional cages. Accordingly, a large space can remain as the internal space of the ball bearing, in which the resin cage is mounted. Thus, an amount of grease, which can be enclosed in the internal space of the ball bearing, is increased. In addition, in a case where grease of the same amount is enclosed in the internal space, the leakage of grease can be suppressed due to the increase of the space in which grease is held.

Furthermore, because a thinning recess is formed in the rear surface of the base portion, the shape of the resin cage for a ball bearing becomes an indented and complicated one. Thus, the leakage of grease into the inside of the bearing can be further suppressed by suppressing the flowability of grease enclosed into the internal space of the ball bearing.

Incidentally, it is preferable that such a resin cage is applied to an angular contact ball bearing employing a crown-shaped cage including the base portion and the claw portions formed as described above.

According to the resin cage for a ball bearing according to the invention, the uniformization of the thickness of the cage of the entire cage can be achieved. Consequently, the deterioration of the flowability of resin at molding thereof and the generation of internal stress can be suppressed properly. Accordingly, the moldability of the cage, which is a resin molded article, can be enhanced.

In addition, the invention can provide the resin cage for a ball bearing, which can increase the substantial volume of the internal space of the ball bearing, as compared with the conventional resin cages, in the case of mounting the resin cage therein by reducing the volume of the resin cage, as compared with the conventional resin cages, and which can increase an amount of grease that can be enclosed into the internal space, by simultaneously suppressing the leakage of the grease to be enclosed thereinto.

DETAILED DESCRIPTION OF PREFERRED EMBODIMENTS

Hereinafter, a resin cage for a ball bearing according to an embodiment of the invention will be-described in detail with reference to FIGS. 1A to 4C. The cage according to the present embodiment is formed by resin injection molding, and is employed in an angular contact ball bearing.

Figure 1A:
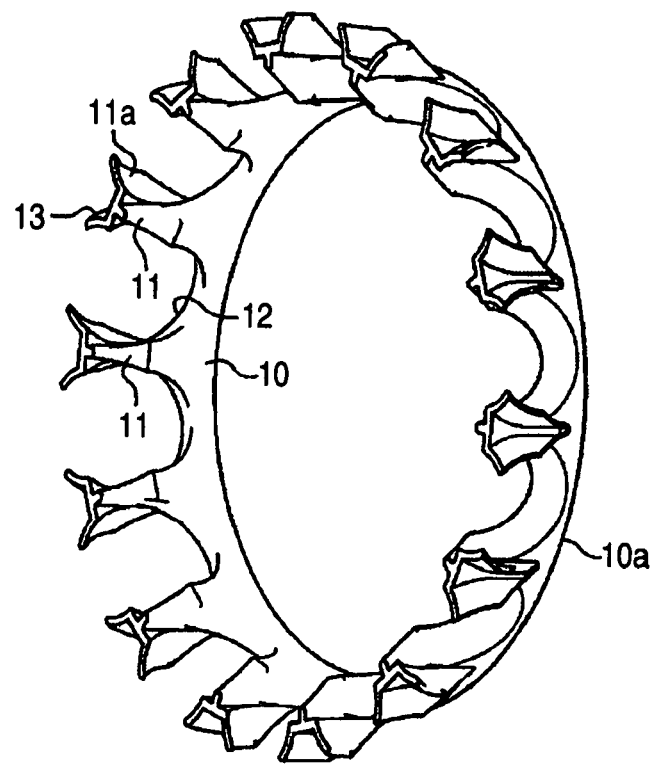
FIG. 1A is a perspective view illustrating the perspective structure of a resin cage for a ball bearing according to an embodiment of the invention.
Figure 1B:
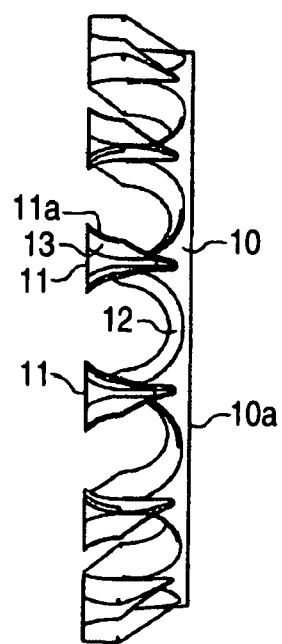
FIG. 1B is a side view illustrating the side structure of the resin cage for a ball bearing according to the embodiment of the invention.

FIG. 1A is a perspective view illustrating the perspective structure of such a resin cage for the ball bearing according to an embodiment of the invention. FIG. 1B is a side view illustrating the side structure of the resin cage for the ball bearing according to the embodiment of the invention. As illustrated in FIGS. 1A and 1B, the resin cage is formed into a substantially crown-like shape, and includes an annular base portion 10, and a plurality of claw portions 11 (the number of the claw portions 11 is, e.g., 14 in an example illustrated in FIGS. 1A and 1B) which are formed to be arranged at constant intervals on the circumference of the base portion 10 and to protrude therefrom. A concave-sphere-like pocket 12 for accommodating balls serving as rolling elements in the angular contact ball bearing is formed on a part between each pair of the adjacent claw portions 11 of such a resin cage. According to the present embodiment, thinning recesses 13 and 14 are formed in an end part 11a of each of the claw portions 11 and a rear surface 10a of the base portion 10, which are intrinsically and locally thickened parts, to thereby uniformize the thickness of the cage that is a resin molded article.

Figure 2:
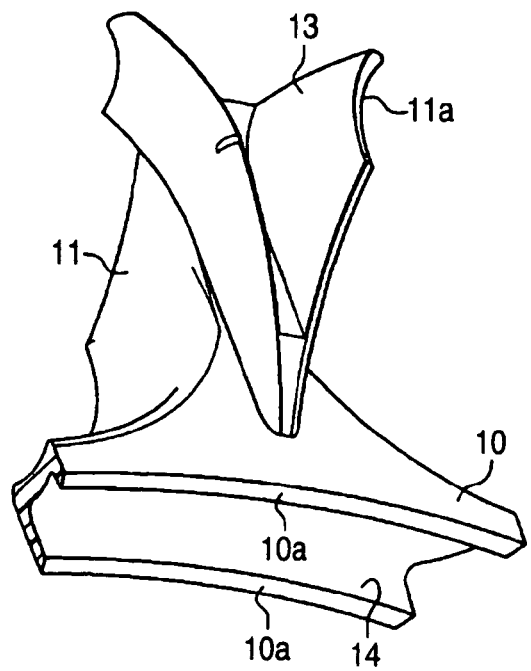
FIG. 2 is an enlarged perspective view illustrating the perspective structure of a claw portion of the resin cage and a peripheral part thereof.
Figure 3:
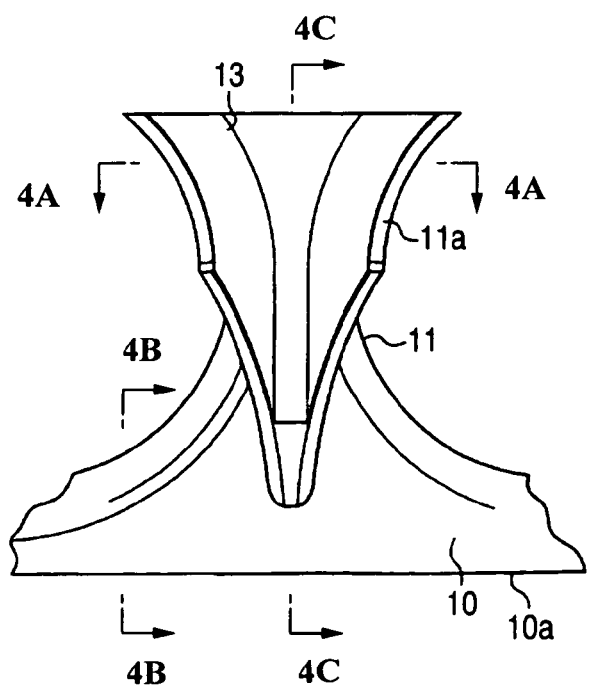
FIG. 3 is an enlarged side view illustrating the perspective structure of the claw portion of the resin cage and the peripheral part thereof.

FIGS. 2 and 3 enlargedly illustrate the claw portion 11 of such a resin cage and a peripheral part thereof. Incidentally, FIG. 2 illustrates the perspective structure of a claw portion of the resin cage and a peripheral part thereof. FIG. 3 illustrates the perspective structure of each of the claw portion of the resin cage and the peripheral part thereof. As illustrated in FIGS. 2 and 3, each of the claw portions 11 is formed to become wider toward the end part thereof in order to form the pocket 12 which is a concave sphere.

Figure 4A:
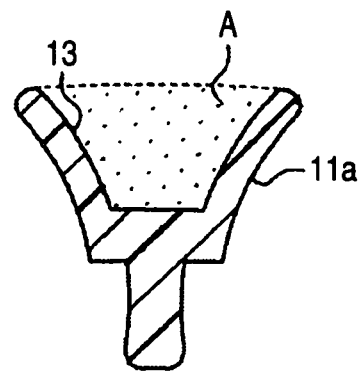
FIG. 4A is an enlarged cross-sectional view illustrating the cross-sectional structure of the resin cage, which is taken along line 4A-4A shown in FIG. 3.

FIG. 4A illustrates the cross-sectional structure of the resin cage, which is taken along line 4A-4A shown in FIG. 3. As illustrated in FIG. 4A, the thinning recess 13 is formed in an end part 11a of each of the claw portions 11 from the top surface thereof. The thickness of the end part 11a of each of the claw portions 11, which is intrinsically and locally large, can be suppressed by removing a part A, which is indicated by being hatched with dotted lines in FIG. 4A, thereby to form the recess 13 in order to perform thinning.

Figure 4B:
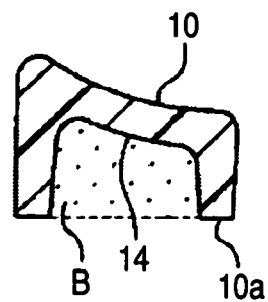
FIG. 4B is an enlarged cross-sectional view illustrating the cross-sectional structure of the resin cage, which is taken along line 4B-4B shown in FIG. 3.
Figure 4C:
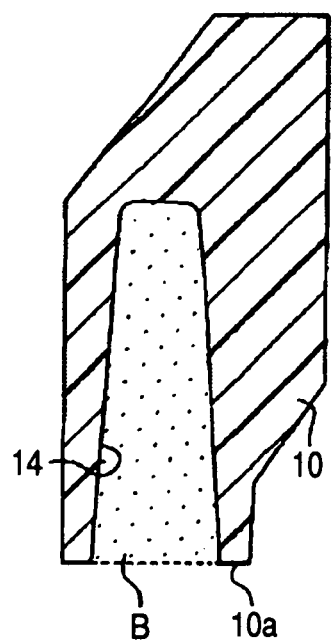
FIG. 4C is an enlarged cross-sectional view illustrating the cross-sectional structure of the resin cage, which is taken along line 4C-4C shown in FIG. 3.

On the other hand, FIG. 4B illustrates the cross-sectional structure of the resin cage, which is taken along line 4B-4B shown in FIG. 3. As illustrated in FIG. 4B, in the resin cage according to the present embodiment, the thinning recess 14 is formed in the base portion 10 from the rear surface 10a. As shown in FIG. 4C illustrating the cross-sectional structure of the resin cage, which is taken along line 4C-4C shown in FIG. 3, the thinning recess 14 is formed more deeply in a part which is intrinsically thicker and is located just under each of the claw portions 11. The thickness of the base portion 10, which is intrinsically and locally large, can be suppressed by removing parts B, which are indicated by being hatched with dotted lines in FIGS. 4B and 4C, thereby to form such a thinning recess 14 in order to perform thinning.

Figure 5:
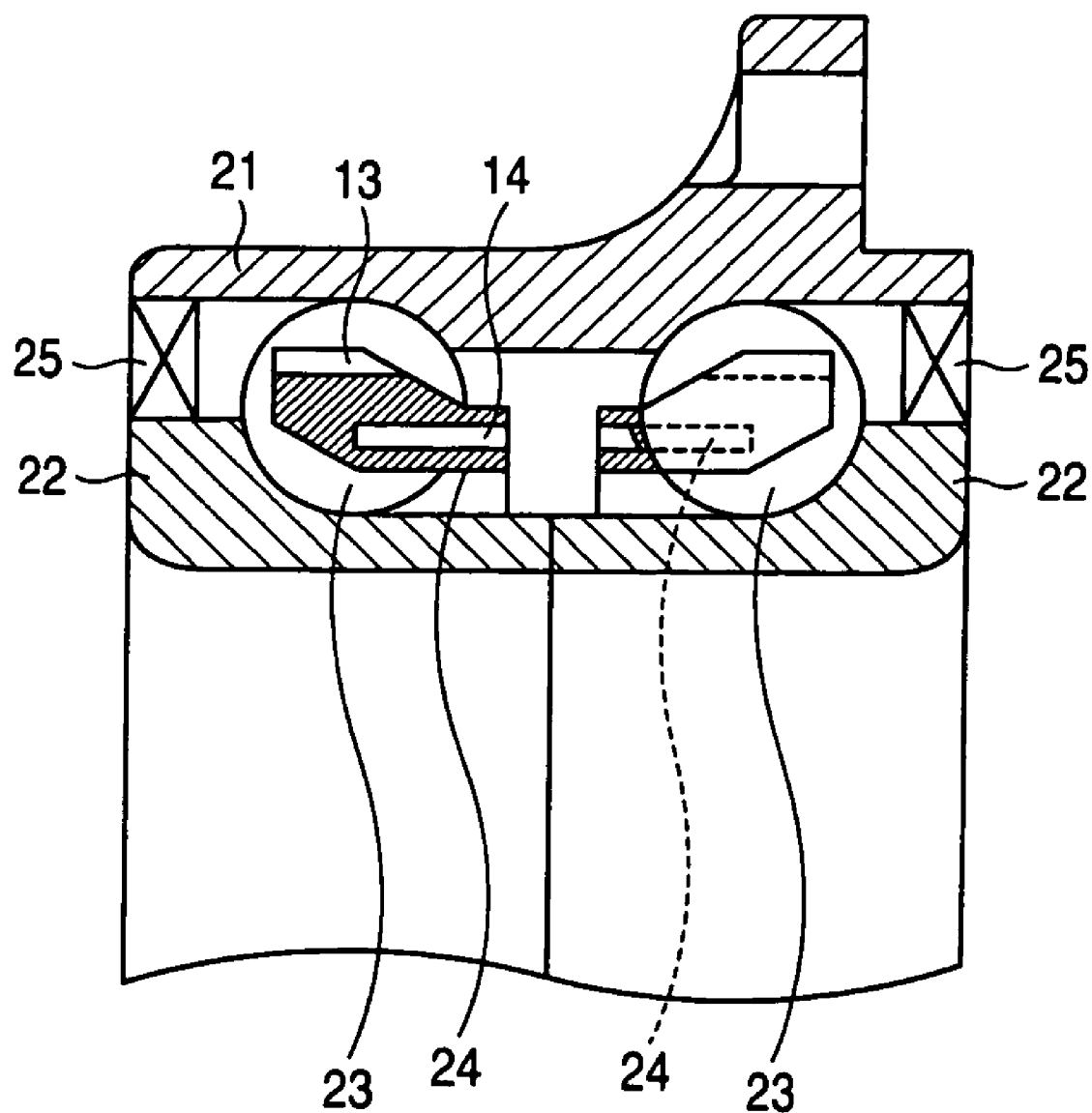
FIG. 5 is a cross-sectional view illustrating an angular contact ball bearing using the resin cage according to the present invention.
Figure 6:
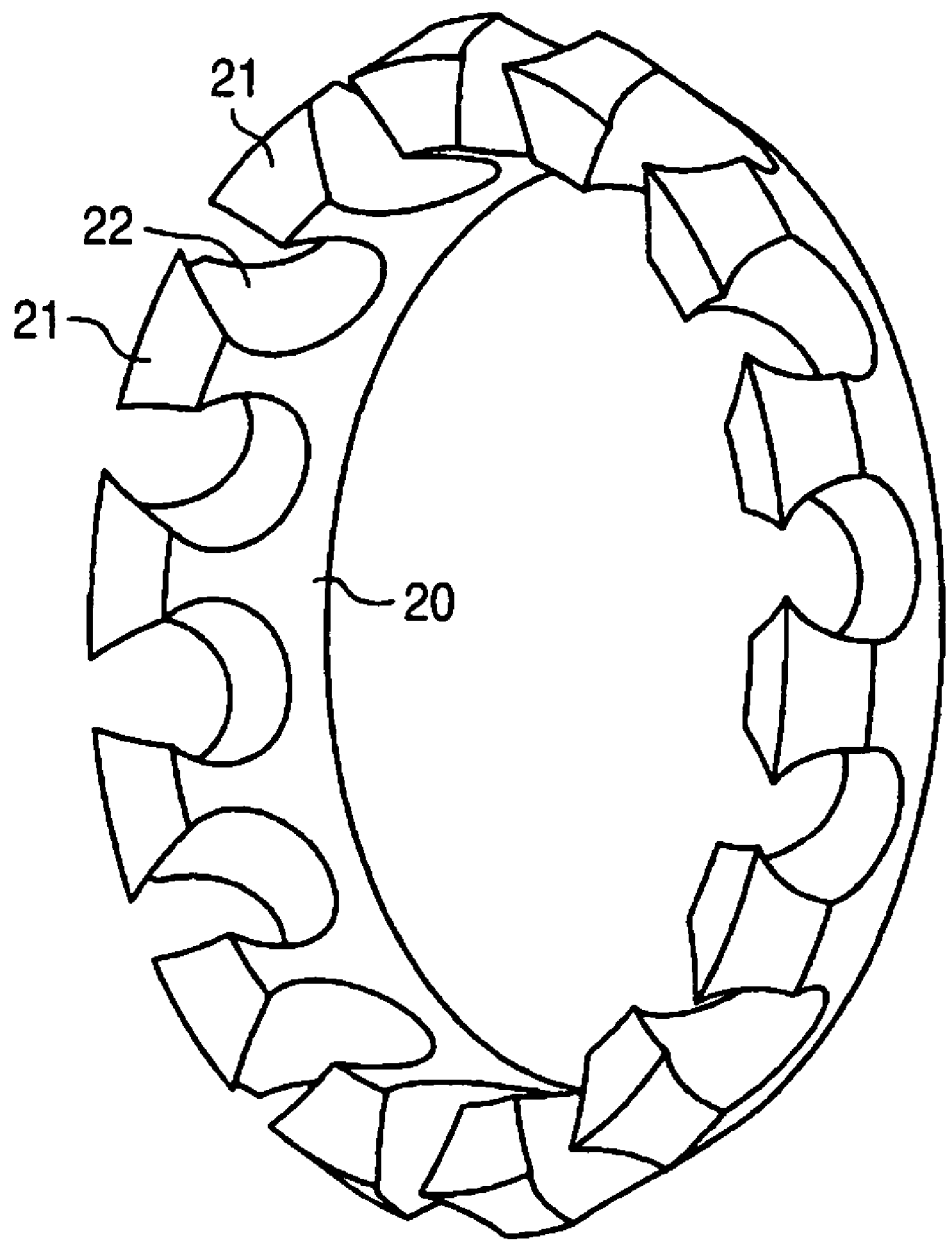
FIG. 6 is a perspective view illustrating the perspective structure of a conventional resin cage for a ball bearing.

FIG. 5 is a cross-sectional view illustrating an angular contact ball bearing using the resin cage according to the embodiment of the present invention. As shown in FIG. 5, the angular contact ball bearing includes an outer ring 21, an inner ring 22, a plurality of balls 23 serving as rolling elements arranged between the outer and inner rings 21 and 22, a cage 24 for holding the balls at constant intervals in the circumferential direction, and a pair of sealing devices 25 for sealing an internal space of the angular contact ball bearing between the outer and inner rings 21 and 22.

Although not shown in the drawing, grease as the lubricant is enclosed in the internal space between the outer and inner rings. In the usage of the angular contact ball bearing, the grease is agitated by the balls 23 and the cage 24 and a part of the grease moves in and is retained by the recesses 13 and 14 of the cage.

Incidentally, the grease may be filled into at least one of the recesses 13 and 14 in advance.

Further, in the case that excessive grease is enclosed in the interior of the ball bearing, in the conventional art, there is probability that the grease agitated by the balls and the cage and leaks out of from a part between the sealing device and the inner or outer ring. However, with using the resin cage according to the present invention, as the part of agitated grease moves in and is retained by the recesses of the cage, the grease does not leak out of the bearing. Further, as the grease retained by the recesses is steadily supplied to the contact portions between the balls and the inner and outer rings for a long period of time, the life of the bearing is improved.

The resin cage for the ball bearing according to the present embodiment can achieve the following advantages.

(1) The thinning recess 13 is formed in the end part 11a, whose thickness is intrinsically and locally large, in each of the claw portions 11. Thus, the thickness of each of the claw portions can be suppressed. In addition, the thinning recess 14 is formed in the rear surface 10a of the base portion 10, whose thickness is intrinsically and locally large. Thus, the thickness of the base portion can be suppressed. Consequently, the uniformization of the thickness can be achieved over the entire resin cage. Consequently, the deterioration of the flowability of resin at molding thereof and the generation of internal stress, which are caused due to the presence of a thickness difference among parts of the cage, can be suppressed properly. Accordingly, the moldability of the cage which is a resin molded article can be enhanced properly.

(2) As a result of enhancing the moldability of the resin cage and the precision of the shape and dimensions thereof, the bearing performance of an angular contact ball bearing employing such a resin cage can be enhanced.

(3) Moreover, the thinning recess 14 is formed in the rear surface 10a of the base portion 10 in addition to the thinning recess 13 formed in the end part 11a of each of the claw portions 11. Thus, the volume of the entire resin cage for the ball bearing can be made small, as compared with those of the conventional cages. Accordingly, a large space can remain as the internal space of the ball bearing, in which the resin cage is mounted. Thus, an amount of grease, which can be enclosed into the internal space of the ball bearing, can be increased. In addition, in a case where grease of the same amount is enclosed in the internal space, the leakage of grease can be suppressed due to the increase of the space-in which grease is held.

In addition to the thinning recess 13 formed in the end part 11a of each of the claw portions 11, the recess 14 is formed in the rear surface 10a of the base portion 10. Thus, the shape of the resin cage for the ball bearing becomes an indented and complicated one. Consequently, the internal space of the ball bearing is divided. Accordingly, the movement of grease is blocked. Further, because of the indented and complicated shape of the resin cage for the ball bearing, the cage has a large surface area. Thus, fluid friction caused between grease and the resin cage for the ball bearing is large. Thus, the resin cage has an advantage in blocking excessive movement of grease. Consequently, the flowability of grease enclosed in the internal space of the ball bearing can be suppressed. Accordingly, it can be expected that the leakage of grease can be further effectively suppressed.

Incidentally, the aforementioned embodiment can be modified as follows.

That is, although the thinning recesses 13 and 14 are respectively formed in the end part 11a of each claw portion 11 and the rear surface 10a of the base portion 10 of the resin cage according to the aforementioned embodiment, the resin cage can be modified so that a thinning recess is formed in only one of the end part 11a and the rear surface 10a. In this case, the thickness of each of parts, which are intrinsically and locally thick, can be suppressed. Consequently, the moldability of the resin cage can be enhanced to some extent.

Although the resin cage employed in the angular contact ball bearing has been described in the foregoing description of the embodiment, the resin cage for the ball bearing according to the invention can be applied to the ball bearing other than angular contact ball bearings similarly or in a manner pursuant to the aforementioned embodiment.

Technical ideas which can be grasped from the aforementioned embodiments of the invention and modifications thereof will be described below together with advantages thereof.

(a) The ball bearing having the resin cage, which is formed of resin and holds balls serving as rolling elements of the ball bearing, and which includes an annular base portion and a plurality of claw portions that are formed to be arranged at constant intervals on a circumference of the base portion and to protrude therefrom, and which is constructed so that a pocket for accommodating the ball is formed between each pair of adjacent ones of the claw portions. The ball bearing is characterized in that a thinning recess is formed in an end part of each of the claw portions. In such a configuration, the thinning recess is formed in each claw portion's end part, whose thickness is intrinsically and locally large in the cage that is a resin molded article. Thus, the uniformization of the thickness can be achieved over the entire resin cage. Consequently, the deterioration of the flowability of resin at molding thereof and the generation of internal stress, which are caused due to the presence of a thickness difference among parts of the cage, can be suppressed properly. Accordingly, the moldability of the cage can be enhanced. Consequently, the invention can provide a preferred ball bearing having the cage whose shape can be formed with high precision dimensions.

(b) The ball bearing described in the aforementioned item (a), which is featured in that a thinning recess is formed in a rear surface of the base portion. With such a configuration, the thinning recess is formed on the rear surface of the base portion whose thickness is intrinsically thick, similarly to the end part of each of the claw portions. Thus, the further uniformization of thickness of the cage can be achieved. Consequently, the moldability of the cage can be further enhanced.

(c) The ball bearing having the resin cage, which is formed of resin and holds balls serving as rolling elements of the ball bearing, and which has an annular base portion and a plurality of claw portions that are formed to be arranged at constant intervals on a circumference of the base portion and to protrude therefrom, and which is constructed so that a pocket for accommodating the ball is formed between each pair of adjacent ones of the claw portions. This ball bearing is characterized in that a thinning recess is formed in a rear surface of the base portion. According to such a configuration, the thinning recess is formed in the rear surface of the base portion, whose thickness is intrinsically and locally large, in the cage that is a resin molded article. Thus, the uniformization of the thickness can be achieved over the entire resin cage. Consequently, the deterioration of the flowability of resin at molding thereof and the generation of internal stress, which are caused due to the presence of a thickness difference among parts of the cage, can be suppressed properly. Accordingly, the moldability of the cage can be enhanced. Consequently, the invention can provide a preferred ball bearing having the cage whose shape can be formed with high precision dimensions.

(d) The ball bearing described in one of the items (a) to (c) is an angular contact ball bearing. It is preferable that the ball bearings described in the items (a) to (c) are applied to an angular contact ball bearing employing a crown-shaped cage including the base portion and the claw portions formed as described above.

What is claimed is:

1. A resin cage for holding balls in a ball bearing, the resin cage comprising:
   a resin annular base portion;
   a plurality of resin claw portions which are arranged at constant intervals on a circumference of the base portion, and protrude from the base portion;
   a pocket for accommodating the ball, which is formed between each part of adjacent ones of the claw portions; and
   a thinning recess formed in a radially outer wall of an end part of each of the claw portions.

2. The resin cage according to claim 1, further comprising a thinning recess formed in a rear surface of the base portion.

3. The resin cage according to claim 2, wherein the thinning recess of the base portion extends axially inward of the pocket.

4. The resin cage according to claim 1, wherein the resin cage is applied to an angular contact ball bearing.

5. The resin cage according to claim 1, wherein the thinning recess of the end part is formed so as to extend to an axially distal end of the end part.

6. The resin cage according to claim 1, wherein the thinning recess of the end part is formed in an axial direction through an axial center of the end part.

7. The resin cage according to claim 1, wherein the thinning recess of the end part is bordered on both circumferential sides by the end part.

8. The resin cage according to claim 1, wherein the thinning recess of the end part is formed so as to extend to an axially distal end of the claw portions.

9. The resin cage according to claim 1, wherein a distance between walls of the end part bordering circumferential sides of the thinning recess of the end part increases radially outward.

10. The resin cage according to claim 1, wherein the end part and the claw portion form a Y-shape.

11. The resin cage according to claim 1, wherein the thinning recess of the end part is formed so as to extend to a radially distal end of the end part.

12. The resin cage according to claim 1, wherein the thinning recess of the end part is formed so as to allow grease to be filled therein.

13. A resin cage for holding balls in a ball bearing, the resin cage comprising:
    a resin annular base portion;
    a plurality of resin claw portions which are arranged at constant intervals on a circumference of the base portion, and protrude from the base portion;
    a pocket for accommodating the ball, which is formed between each part of adjacent ones of the claw portions; and
    a thinning recess formed in a rear surface of the base portion, the thinning recess of the base portion extending axially inward of the pocket.

14. The resin cage according to claim 13, wherein the resin cage is applied to an angular contact ball bearing.

15. The resin cage according to claim 13, wherein the thinning recess of the base portion is formed axially between an axially innermost part of the pocket and an axially innermost part of the base portion.

16. The resin cage according to claim 13, wherein a distance between an axially outermost portion of the thinning recess of the base portion disposed in a circumferential area of the claw portion and an axially innermost portion of the base portion is greater than a distance between an axially outermost portion of the thinning recess of the base portion disposed in a circumferential area of the pocket and the axially innermost portion of the base portion.

17. The resin cage according to claim 13, wherein a depth of the thinning recess of the base portion in a part of the base portion under each of the claw portions is greater than a depth of the thinning recess in an other part of the base portion.

18. The resin cage according to claim 13, wherein the thinning recess of the base portion is formed so as to allow grease to be filled therein.

19. The resin cage according to claim 13, further comprising a thinning recess formed in a radially outer wall of an end part of each of the claw portions.

* * * * *